H. BROTHERTON.
FLEXIBLE CURVE DEVICE FOR DRAWING OFFICE AND OTHER PURPOSES.
APPLICATION FILED FEB. 3, 1915.
1,161,451. Patented Nov. 23, 1915.
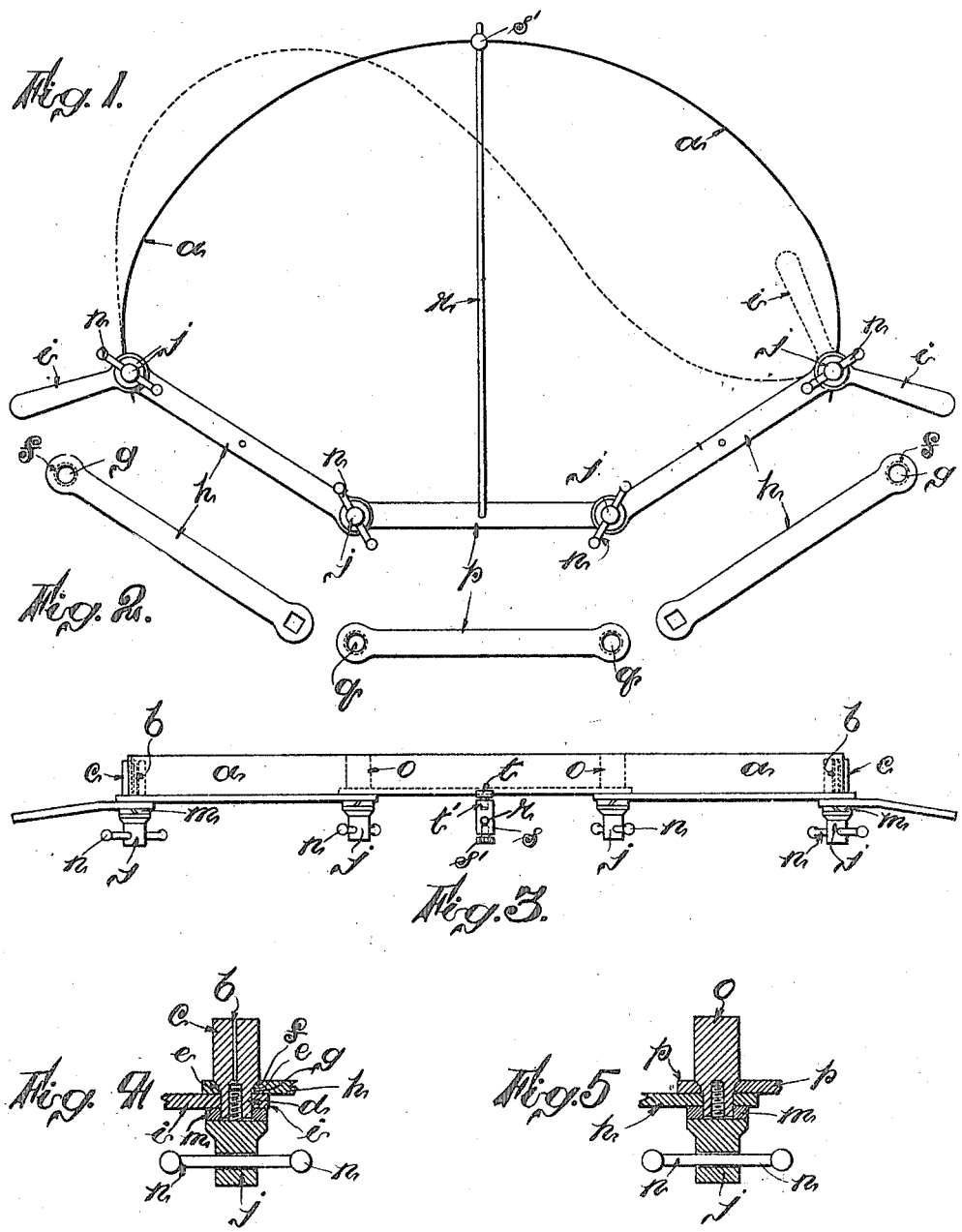

UNITED STATES PATENT OFFICE.

HARRISON BROTHERTON, OF ASHTON-UPON-MERSEY, ENGLAND.

FLEXIBLE CURVE DEVICE FOR DRAWING-OFFICE AND OTHER PURPOSES.

1,161,451.  Specification of Letters Patent.  Patented Nov. 23, 1915.

Application filed February 3, 1915. Serial No. 5,940.

*To all whom it may concern:*

Be it known that I, HARRISON BROTHERTON, subject of the King of Great Britain and Ireland, and resident of Ashton-upon-Mersey, in the county of Chester, England, have invented certain new and useful Improvements in Flexible Curve Devices for Drawing-Office and other Purposes, of which the following is a specification.

My invention relates to improvements in flexible curve devices such as may be employed for the same or similar purposes as French curves in drawing offices and for use in plotting out or filling in curves in efficiency and other diagrams or for other purposes where a device capable of almost infinite variation of curvature would be found useful.

My invention consists in its simplest form of a pair of compass legs connected together at one end by a pivot pin common to them both and having at the other ends of the legs slotted clamping studs directly mounted in holes therein and capable of being adjusted about the centers of said holes, said studs carrying the flexible strip the curvature of which is to be varied. In a modified form of the device I connect the compass legs or arms by clamping studs to the ends of a central link which enables still further variations of curvature of the strip to be obtained. I may combine with the aforesaid feature means for supporting the flexible strip at points intermediate of the main supporting studs.

My invention will be fully described with reference to the accompanying drawings in which—

Figure 1 is a plan of the improved device forming the subject matter of my invention, Fig. 2 separated plans of connecting links hereinafter referred to, Fig. 3 plan of the device shown in Fig. 1, Fig. 4 longitudinal section of one of the rotatable studs and, Fig. 5 longitudinal section of one of the intermediate studs.

In accordance with my invention I provide a flexible strip of material $a$ of any suitable length, width and thickness. Such material may conveniently and preferably be of steel of a high grade such as doctor steel. The ends of the strip are passed through slits $b$ formed in adjustably-rotatable studs $c$, such slits and the strip having a tight though sliding fit so that either end of the strip may be drawn through its stud to vary the character of the curve between the two points at which it is held.

The arrangement of stud which I at present prefer to employ is one in which the slit $b$ is made for the greater part of the length of the stud as shown in Fig. 4, the upper end being reduced in diameter at $d$ so as to leave a conical shoulder $e$ to fit in the countersunk portion $f$ of the hole $g$ in the outer end of each end link $h$ the shank portion passing through hole $g$ to receive a lever handle $i$ by which the stud may be rotated to alter the position of the strip $a$. The shank is D-shaped to correspond with a similar-shaped hole in the handle $i$ and to clamp the latter, link $h$ and stud together. I employ a shouldered clamping screw $j$, and spring washer $m$, the screw being turned by the pin $n$, by a milled head or by any other suitable means. The effect of tightening the screw $j$ is to pull the conical part of stud $c$ into the countersunk part $f$ of hole $g$ and thus firmly grip the strip $a$ in the slit $b$ and prevent it sliding therein during the rotation of the stud to bend the strip $a$ to the curve required. A further effect is to tighten the joint parts to give sufficient friction to enable the stud and parts to be held in the adjusted position steadily, though the screw $j$ may be tightened up sufficiently if required to prevent any movement of the parts after adjustment. When the parts are quite slack the strip $a$ can be moved freely through the slit $b$. Each stud $c$ may be rotated separately in either direction.

The links or arms $h$ may be directly connected together at their inner ends by an ordinary compass joint or by a clamping stud such as $o$, Fig. 5 which is very similar to those at the ends except it is without a slit. The arms $h$ may be extended or be closed in about their common pivoted center and thus again enable the character of the curve formed by the strip to be varied. The curve may have its convex side nearest to the joint of the hinged arms or the concave side may be nearest thereto. Instead of coupling the inner ends of the arms $h$ directly at their central point I may couple them to a link $p$, as shown in the drawing such link having counter-sunk holes $q$ while the inner ends of links $h$ have square holes to engage with corresponding portions on the shanks of studs $o$. The joints may be controlled by screwed studs $j$ as in the end studs. The employment of the link enables a still greater variation of curvature to be given to the strip.

By the means hereinbefore described the strip $a$ may be made to assume an almost infinite variety of curves, an example being shown by the thick black line in Fig. 1 and another example by the broken line in the same figure.

In cases where there is a considerable length of strip $a$ between the studs its central portion may be rigidly supported by one or more arms $r$ carried by the hinged arms previously referred to. The outer end of the arm may be fitted with a small clamping stud $s$ secured by clamping screw $s^1$. A slitted head $t$ is adapted to pass over the flexible strip. The head $t$ is freely movable about its shank $t^1$ in the stud $s$ so that it will accommodate itself to the curvature of the flexible strip and thus not distort the latter. The inner end of the arm $r$ shown in the drawings is merely bent at its rear end and passed into a hole in the central link.

What I claim as my invention and desire to secure by Letters Patent is:—

1. In a draftsman's curve, jointed extension arms provided with locking devices, slotted studs journaled at the end portions of the jointed arms, a flexible band slidable longitudinally in the slotted studs, and means for locking the band to the studs and for locking the studs to the arms.

2. In a draftsman's curve, a series of arms pivoted together and provided with locking devices at their pivots, slotted studs journaled at the end portions of the series of arms, a flexible band slidable longitudinally in the slotted studs, and means for locking the band to the studs and for locking the studs to the arms.

3. In a draftsman's curve, jointed extension arms provided with locking devices, slotted studs journaled at the end portions of the jointed arms, a flexible band slidable longitudinally in the slotted studs, a rod having one end pivoted to one of the arms and its other end adjustably connected to the said band, and means for locking the band to the studs and for locking the studs to the arms.

In testimony whereof I have hereunto set my hand in the presence of two witnesses.

HARRISON BROTHERTON.

Witnesses:
WILLIAM W. TAYLOR,
AMY E. EVINS.